Nov. 8, 1932.  L. E. GODFRIAUX  1,886,393
PUMPING UNIT FOR HYDRAULIC POWER TRANSMISSION SYSTEMS
Filed Aug. 1, 1930   5 Sheets-Sheet 1

Inventor:
Louis E. Godfriaux,
Fisher, Clapp, Soans & Pond Attys.

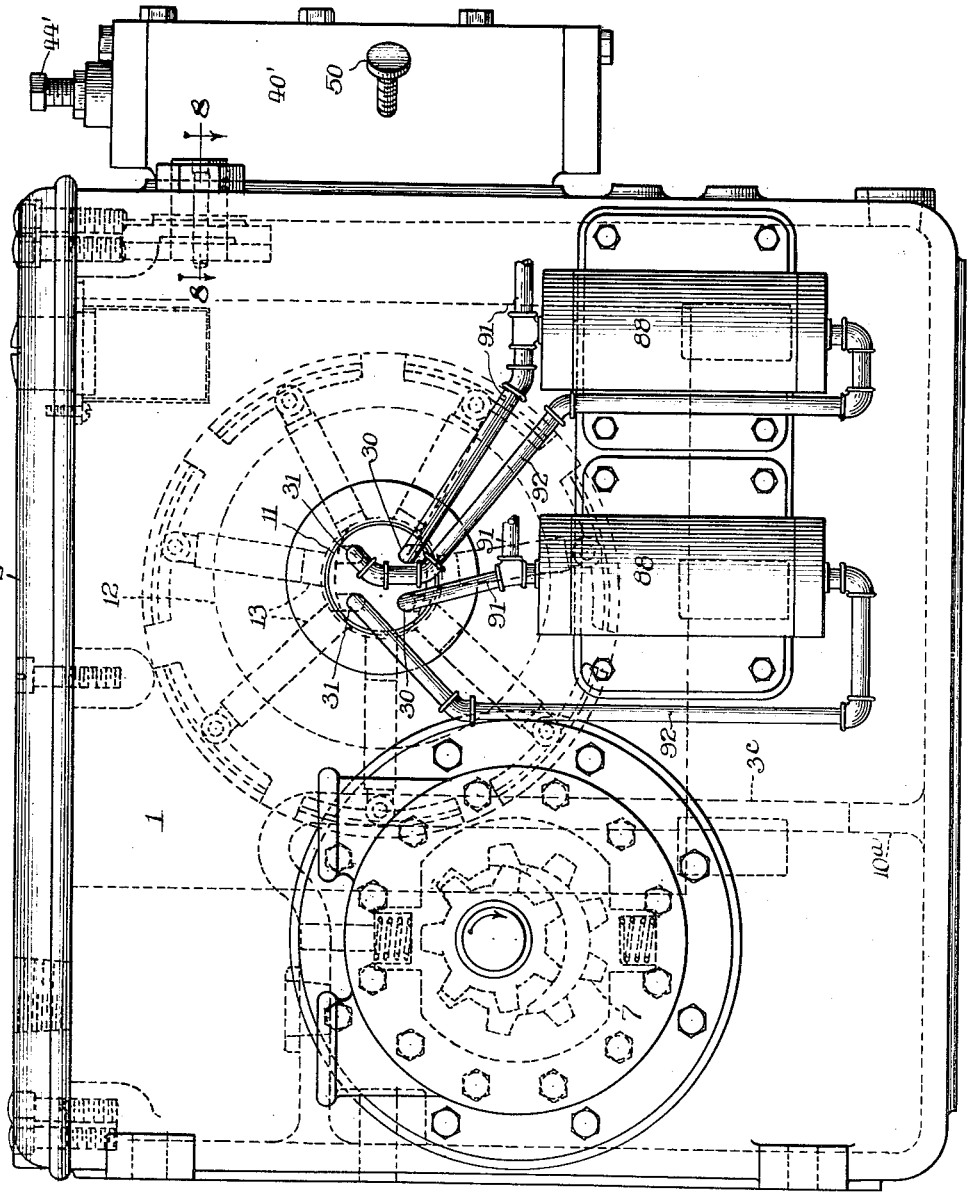

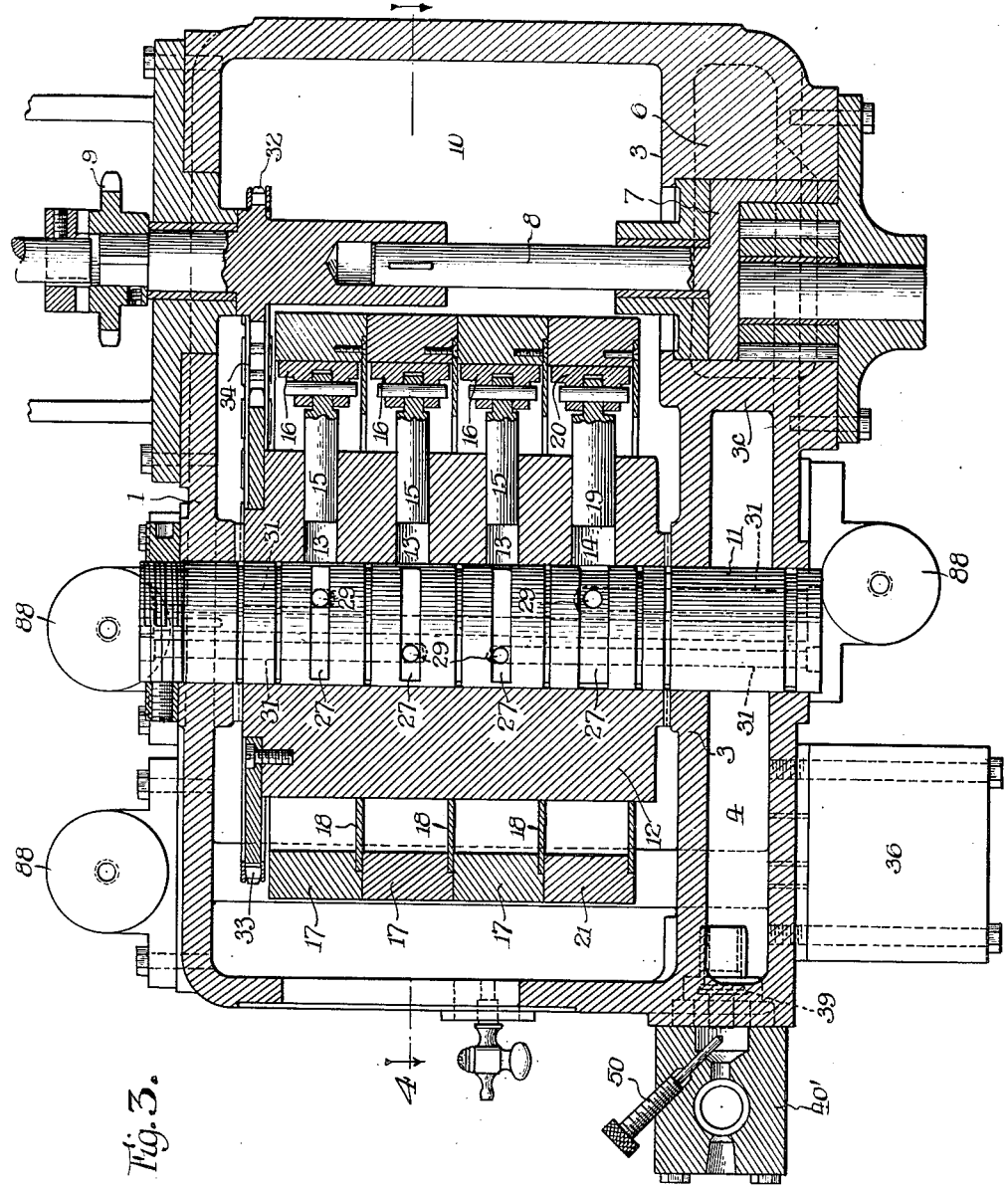

Nov. 8, 1932.  L. E. GODFRIAUX  1,886,393
PUMPING UNIT FOR HYDRAULIC POWER TRANSMISSION SYSTEMS
Filed Aug. 1, 1930  5 Sheets-Sheet 4
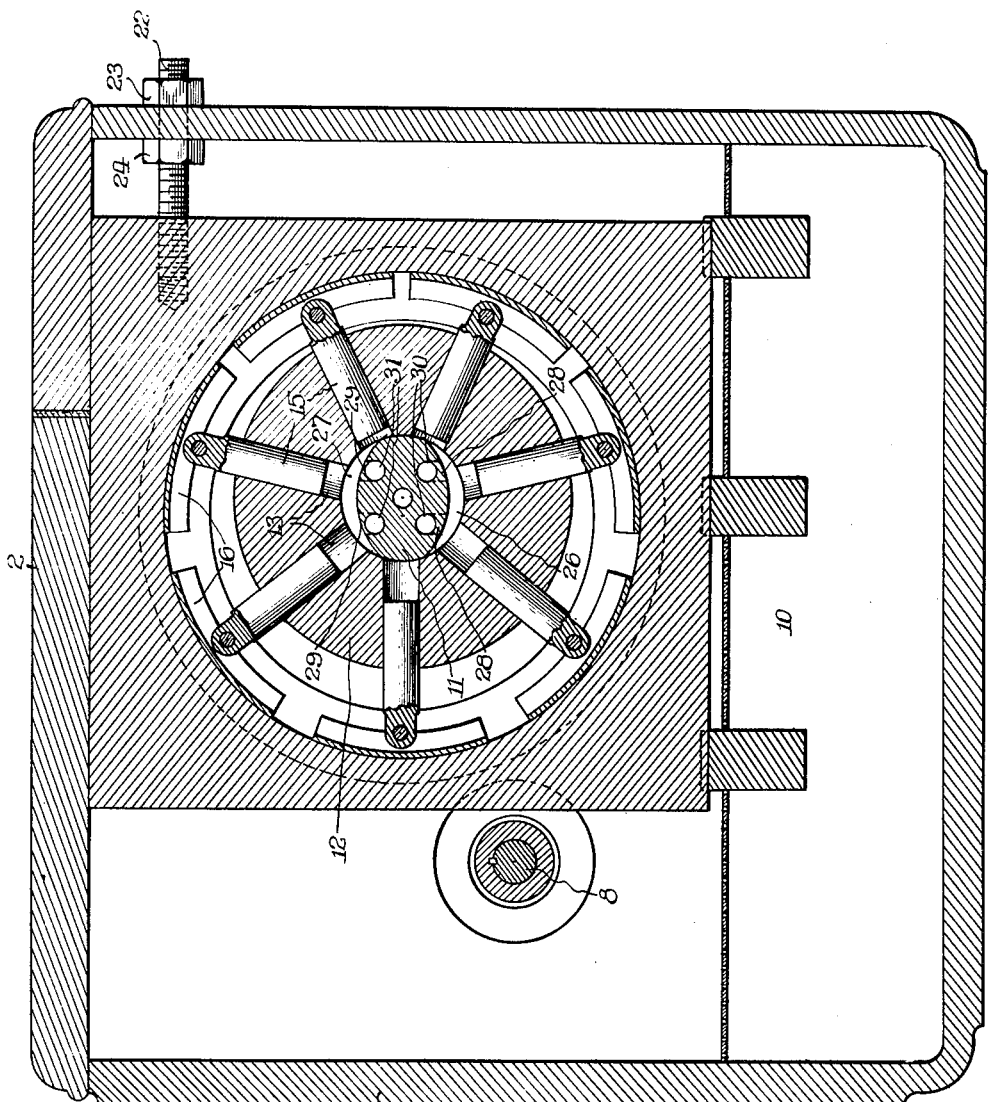
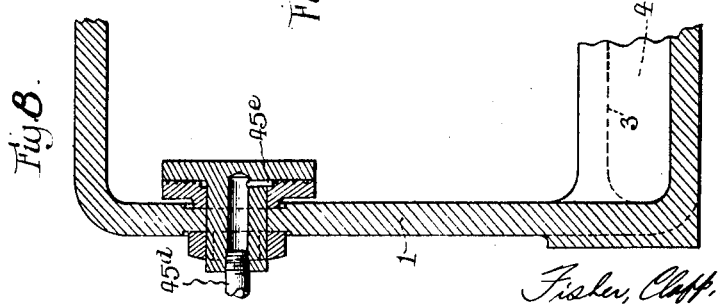
Inventor:
Louis E. Godfriaux,
Fisher, Clapp, Soans & Pond Attys.

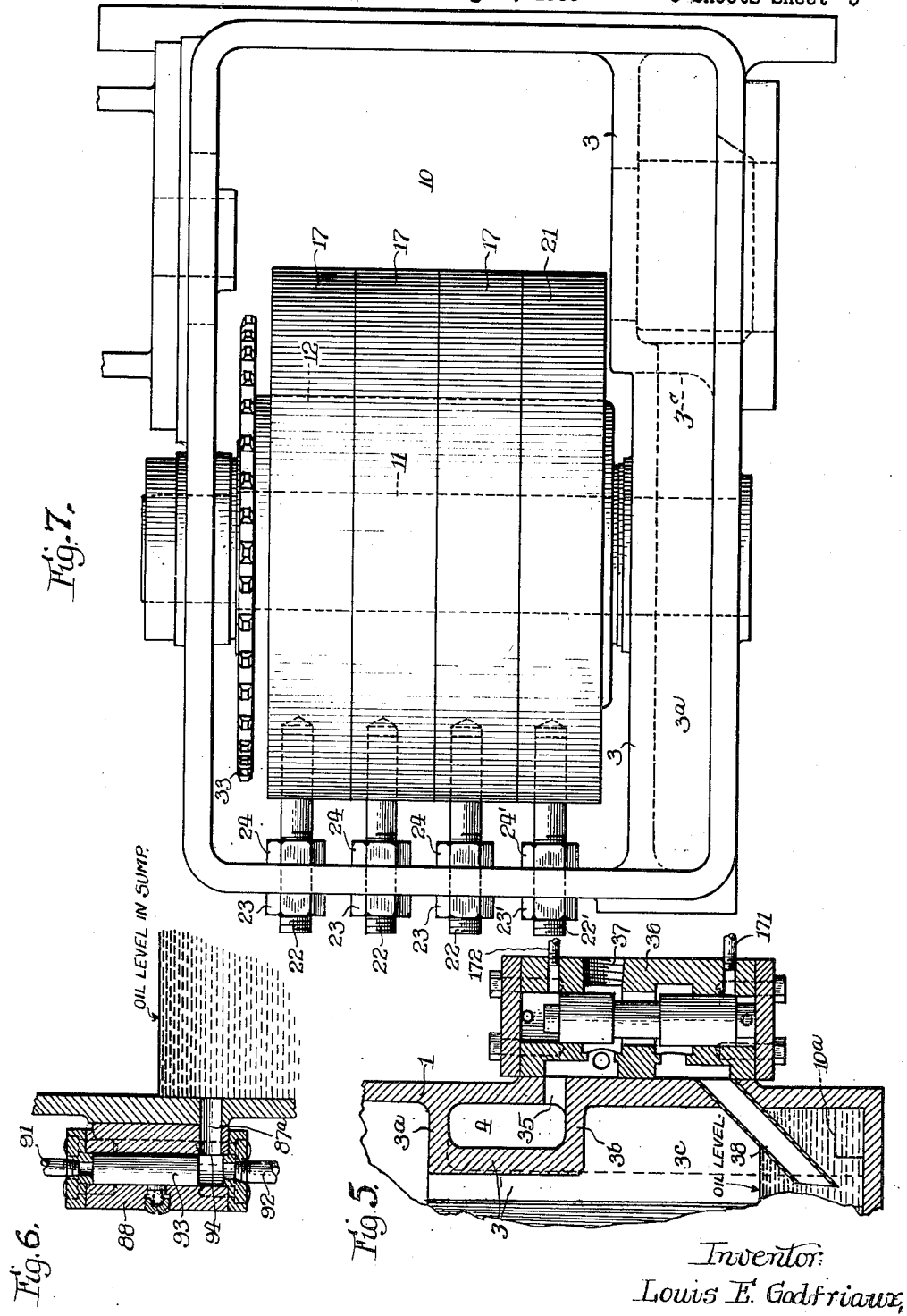

Patented Nov. 8, 1932

1,886,393

UNITED STATES PATENT OFFICE

LOUIS E. GODFRIAUX OF MADISON, WISCONSIN, ASSIGNOR TO GISHOLT MACHINE COMPANY, OF MADISON, WISCONSIN, A CORPORATION OF WISCONSIN

PUMPING UNIT FOR HYDRAULIC POWER TRANSMISSION SYSTEMS

Application filed August 1, 1930. Serial No. 472,366.

The present invention comprises an improved pumping unit more especially designed for cooperation with a hydraulic power transmission system designed to effect both rapid and slow travel of moving parts of lathes or other machine tools under low and high fluid pressures, respectively. One hydraulic power transmission system which the present invention is well adapted to serve is disclosed in my Letters Patent No. 1,855,912, granted April 26, 1932; but it should be understood that the pumping unit of the present invention is not limited in its application to the power transmission system disclosed in the said Letters Patent, but may advantageously be employed in connection with other specifically different systems based on the same general operative principle as that of the aforesaid Letters Patent.

In the embodiment of the invention herein presented, the principal pump consists of a low pressure large volume pump of any suitable type for putting the oil under a relatively low pressure suitable for effecting rapid traverse movements of tool carriages. The other four pumps are of the radial cylinder type, all mounted in and carried by a rotor turning on a ported stationary axis or shaft, this latter having longitudinal ducts connected through short radial ports to intake and outlet chambers communicating with the inner ends of the pump cylinders. One of these pumps, which takes oil from the low pressure pump and raises it to a relatively high pressure for furnishing oil for the feed system, is preferably permanently set to pump full volume, although adjustable as to volume; while the other three, which are feed release pumps functioning as retarding or metering devices during the feed period, are preferably made independently adjustable. In practice, these feed release or retardant pumps are connected on their intake sides to the discharge sides of the hydraulic motors that actuate the tool carriages, and their purpose is to steady and render uniform the feed movements of said motors by controlling the exhaust of the latter, this control being regulable by varying the length of piston stroke of said feed release pumps. The manner in which these feed release pumps cooperate with the other pumps of the system through flow lines and function and direction valves interposed in said flow lines is disclosed in the specification of my aforesaid Patent No. 1,855,912.

In the accompanying drawings I have illustrated one practical and approved embodiment of the invention, in which:—

Fig. 2 is a side elevation of the pump unit, viewed from the side opposite that of Fig. 1.

Fig. 3 is a horizontal section through the pumping unit, on the offset line 3—3 of Fig. 1.

Fig. 4 is a vertical section through the pumping unit on the line 4—4 of Fig. 3, in the plane of one of the retardant pumps.

Fig. 5 is a vertical section through a bypass valve for the low pressure large volume pump, on the line 5—5 of Fig. 1.

Fig. 6 is a vertical section through one of the feed release pump pressure equalizing valves, on the line 6—6 of Fig. 1.

Fig. 7 is a top plan view of the pumping unit, with the cover removed.

Fig. 8 is a horizontal section through a portion of the pumping unit casing and an air bleeder, on the line 8—8 of Fig. 2.

Figure 1:
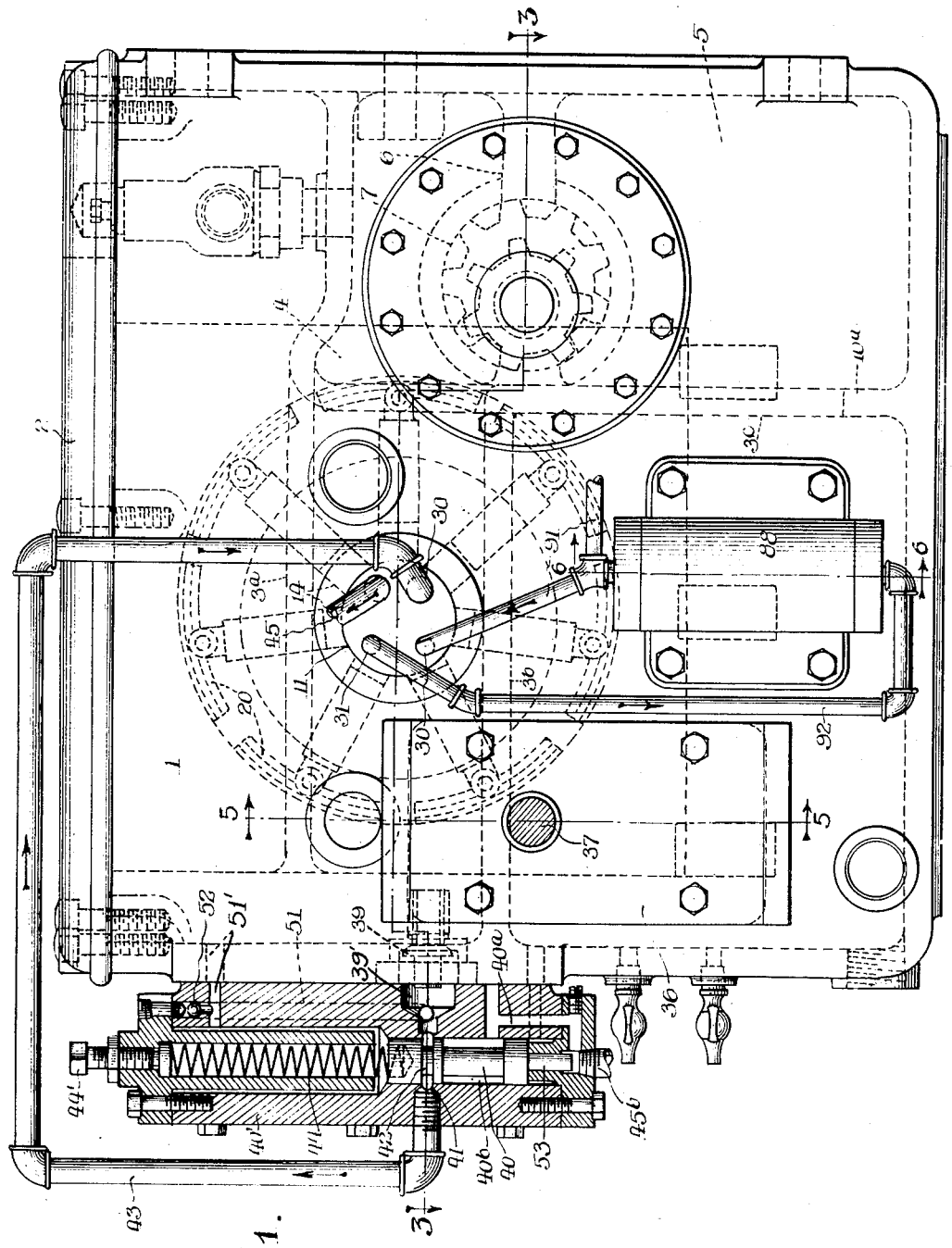
Fig. 1 is a side elevation of the pumping unit showing a cut off valve in vertical section.

Describing now the pumping unit, and referring more particularly to Figs. 1 to 4 and 7, 1 may designate a rectangular housing or casing equipped with a removable cover plate 2 and containing an inverted L-shaped vertical partition 3, the top and bottom edges of the horizontal limb of which are connected to the adjacent side wall by walls 3ª and 3ᵇ (Fig. 5), the inner edge of the vertical limb being connected to the side wall by a wall 3ᶜ. This forms between the horizontal limb of partition 3 and the adjacent side of the casing a relatively narrow oil traverse chamber 4 and between the vertical limb of partition 3 and the adjacent side of the casing a suction chamber 5 covered by a horizontal partition 6 through which extends an internal gear pump, the rotor 7 of which is mounted on and driven by a shaft 8 (Fig. 3), this latter being driven by a sprocket 9 actuated from any suitable source of power. This type of internal gear pump is well known and need not be further herein described.

The lower portion of the casing or housing, with the exception of the suction chamber 5, constitutes an oil sump 10 containing a body of oil. The pump sucks oil from the sump through a port 10ª in the wall 3ᶜ into the suction chamber 5 and delivers it into the traverse chamber 4.

Mounted in and between the opposed side walls of the casing and extending through the partition 3 is a fixed arbor 11, on which is mounted to rotate a barrel 12 formed, in the instance shown, with three radial groups of feed-release or retardant pump cylinders 13 of uniform diameter and a further radial group of booster or high pressure pump cylinders 14 of somewhat larger diameter. Engaged with the cylinders 13 are plungers 15, the outer ends of which are pivotally jointed to arcuate shoes 16 that slidably engage the internal peripheries of a group of circularly apertured plates 17. As shown in Figs. 3 and 7, the plates 17, which are disposed side by side and preferably supplied with interposed washers 18, may be bodily adjusted by screw studs 22 locked in place by nuts 23 and 24 to vary the eccentricity of the axis of the arbor 11 relatively to the circular guiding surfaces of the plunger shoes 16 so as to vary the volume of liquid handled by the pumps. The cylinders 14 are equipped with plungers 19 similarly articulated at their outer ends to shoes 20 sliding over the inner periphery of a circular opening in a similar plate 21 which may be fixed in adjusted position by a similar screw stud 22' and locked in place by nuts 23' and 24'. The arbor 11, in transverse planes coincident with the inner ends of the respective cylinders, is milled down on opposite sides to provide crescent-shaped chambers forming intake and discharge chambers 26 and 27 (Fig. 4), and these chambers in turn communicate through short ports 28 and 29 with longitudinal intake and discharge ducts 30 and 31 extending lengthwise of and through the arbor 11; it being understood that there is an intake duct and a discharge duct for each pumping unit. The pump barrel 12 may be rotated from the shaft 8 by a sprocket 32 on the latter shaft, a large sprocket 33 on the pump barrel and a sprocket chain 34.

The oil delivered by the gear pump flows through the passage 4, and the major portion thereof passes through port 35 (Fig. 5) into the valve chamber of a traverse oil by-pass valve 36 mounted on a side wall of the casing 1, whence it may flow through an outlet port 37 to the motivating cylinders of the turret and cross slides or, when the valve 36 is in the position shown in Fig. 5, the traverse oil is by-passed through a duct 38 back into the sump, at which time the oil flow lines from port 37 to the motivating cylinders of the slides or other moving parts of the machine are closed to the passage of oil therethrough. The remaining portion of the low pressure oil flows past a check valve 39 and through a cross passage 39' into the valve chamber of a cut-off valve 40' mounted on one side of the housing 1, the oil normally flowing through registering annular channels 41 and 42 in the valve casing 40' and valve body 40, (Fig. 1) and thence by a pipe line 43 (Fig. 1) to the intake duct 30 of the high pressure pump 14; the cut-off valve being normally maintained in the position shown by the thrust of a spring 44, which may be adjusted by a screw 44' to maintain the high pressure oil at the desired operating pressure. Under some circumstances, as when the desired operating pressure of the high pressure oil has been reached, the cut-off valve 40 is shifted so as to admit high pressure oil from a pipe line 45ᵇ, above the check valve 39, which, of course, temporarily interrupts the flow of the low pressure oil to the booster pump 14, the high pressure oil reacting through the pipe 45ᵇ, raising a plunger 53 which in turn raises the cut-off valve 40 and permits the high pressure oil to flow through a duct 40ª in the valve casing and a recess 40ᵇ in the valve body, against the check valve 39; and at such times the high pressure pump 14 idly circulates oil between its discharge and intake.

The low pressure oil passing by route 43 to the intake side of the high pressure pump 14 is boosted in pressure by the latter, and passes from the discharge duct 31 of said pump by a pipe line 45 (see Fig. 1) through suitable direction and function valve systems to motors which effect the rapid traverse, feed, and return movements of the turret, cross slides, and other movable parts of the lathe. In some hydraulic transmission systems—for example, that disclosed in my aforesaid Letters Patent—an accumulator or reservoir for the high pressure oil is interposed in the system, and the oil in such accumulator is placed under pneumatic pressure, which may be supplied by the pump 14 in the following way. The check valve 39 is locked closed by a screw 50 (Figs. 2 and 3), thus cutting off the supply of oil through line 43 to the high pressure pump 14, so that the latter is compelled to pump air, which is drawn in through a duct 51 (Fig. 1) in the casing of the cut-off valve 40', said duct communicating at one end with the cross passage 39' and at its other end with atmosphere through a cross passage 51' and a check valve 52 that normally closes said duct 51 to atmosphere when the check valve 39 is open for the passage of low pressure oil and also when the high pressure oil is admitted against the check valve 39 to hold the latter closed. When the desired air pressure in the accumulator is reached, the air pressure in line 45 reacts through pipe 45$^b$ (Fig. 1) which is a branch of pipe 45, raising the plunger 53 which in turn raises the cut-off valve 40, and permits the compressed air to return through the duct 40$^a$ in the valve casing, the recess 40$^b$ in the valve body and line 43 to the intake side of the pump, thereby preventing any further rise in pressure. As above stated, the same branch pipe 45$^b$ also performs a similar function when high pressure oil is being pumped, which takes place after valve 39 has been released by backing off the locking screw 50.

Connected into line 45 is another branch line 45$^d$ which leads into an air bleeder valve 45$^e$ (Fig. 8) mounted in a side wall of the casing 1 of the pumping unit. The purpose of this air bleeder is to free the system of air that gets into the oil, and at the same time prevent any series amount of oil escaping, the principle being that the air will escape quite freely through a fine passage, while oil, due to its viscosity will flow comparatively slowly and in an amount not enough to seriously drain the system. In the air bleeder line 45$^d$ is a cock (not shown) which, of course, is closed when charging the accumulator with compressed air, and is left open when the system is operating. With the structural details of this air bleeder the present invention is not concerned, since any device presenting a long fine flow passage, such as that shown in Fig. 8, may be employed.

The low pressure oil used for effecting traverse movements of the tool carriages flows past the traverse oil by-pass valve 36 and is conducted by a suitable pipe line and branches to and through the aforesaid direction and function valve systems for effecting the rapid traverse and return movements of the tool carriages and other movable parts of the lathe. The by-pass valve 36 is actuated and controlled by fluid pressures, in turn governed by a control device, as fully described in my aforesaid Letters Patent, so as to maintain the normal flow of low pressure oil therethrough when the system is operating, but to open the passage to the sump (as shown in Fig. 5) when the flow lines to the motivating cylinders are closed to the passage of oil therethrough.

Describing next the function of an equalizing valve 88 shown in Figs. 1, 2 and 6, it may be remarked that, since the feed release oil on the intake side of the pump 13 is under a pressure substantially equal to the cylinder operating pressure less the resistance pressure of the work, while the discharge from said pump into the sump is practically at zero pressure, there would exist a considerable liability of leakage from the intake chamber 26 to the discharge chamber 27. The equalizing valve, shown in section in Fig. 6, comprises the casing 88 and a sliding plunger 93 therein which at one end is adapted to over-run a port 94 that registers with a port 87$a$ leading to the sump. One end of the plunger 93 is in communication with a feed release line 91 that connects the discharge side of an hydraulic motor with the intake side of a feed release pump, and the other with a feed discharge line 92 that connects the discharge side of said feed release pump with the lower end of the chamber of valve 88, as shown in Figs. 1 and 2, and as more fully disclosed in my aforesaid Patent No. 1,855,912. The superior pressure in the feed release line 91 shifts the plunger 93 to a position wherein it cuts off the sump port 94 until the pressure has been built up in the discharge line 92 to a point where the plunger 93 is shifted back to slightly uncover the sump discharge port 94; the plunger 93 being balanced when the opening through the sump port 94 is sufficiently restricted to substantially equalize the pressures in lines 91 and 92. As stated, this substantially equalizes the pressures in the intake and discharge chambers 26 and 27 of the pump and thus prevents leakage between said chambers with consequent loss of pressure on the intake side, the object of this device being to prevent any uncontrolled or variable feed of the slide.

While the broad combination of a low pressure pump and a high pressure or booster pump is old and known in systems of this character, as is also the broad combination of a high pressure pump supplying a motor fluid and a feed release or retardant pump, operating to meter the exhaust, the pumping unit herein disclosed is believed to embody numerous novel structural features contributing to simplicity, compactness and high efficiency; notably the intake and discharge ducts for the rotary high pressure and metering pumps formed in a stationary arbor on which said pump revolves, and the means for independently varying the displacements of said pumps. The invention, therefore, in its broader aspects, is not to be understood as limited to the specific details of structure and organization described and shown herein, but comprehends such variations, modifications and mechanical equivalents as fall within the spirit and purview of the appended claims.

I claim:

1. A pumping unit for a hydraulic power transmission system for lathes and like machines, comprising a box-like casing the lower portion whereof forms an oil sump, a low pressure oil pump communicating on its intake side with said sump, a fixed arbor mounted in said casing, a pair of rotary pumps mounted side by side on said arbor, the latter being formed with intake and discharge ducts for said rotary pumps, a flow line leading from the discharge side of said low pressure pump to the intake duct of one of said rotary pumps, and a flow line leading from the discharge duct of the other of said rotary pumps into said sump.

2. A pumping unit for a hydraulic power transmission system for lathes and like machines, comprising a box-like casing the lower portion whereof forms an oil sump, a low pressure gear pump communicating on its intake side with said sump, a fixed arbor mounted in said casing, a pair of rotary radial cylinder pumps mounted side by side on said arbor, the latter being formed with longitudinal intake and discharge ducts for said pumps, a flow line leading from the discharge side of said gear pump to the intake duct of one of said rotary pumps, and a flow line leading from the discharge duct of the other of said rotary pumps into said sump.

3. A pumping unit for a hydraulic power transmission system for lathes and like machines, comprising a box-like casing the lower portion whereof forms an oil sump, a low pressure oil pump communicating on its intake side with said sump, a fixed arbor mounted in said casing formed with longitudinal intake and discharge ducts and with transversely disposed opposed intake and discharge chambers communicating respectively with said intake and discharge ducts, a pair of rotary radial cylinder pumps mounted side by side on said arbor, a flow line leading from the discharge side of said low pressure pump to the arbor intake duct supplying one of said rotary pumps, a flow line leading from the arbor discharge duct of the other of said rotary pumps to said sump, and a pressure equalizing valve mounted on said casing and communicating with both the intake and discharge lines of said other rotary pump and serving to substantially equalize the pressures in the arbor intake and discharge chambers of said last-named pump.

4. A pumping unit for a hydraulic power transmission system for lathes and like machines, comprising a box-like casing the lower portion whereof forms an oil sump, a drive shaft journaled in said casing, a gear pump in said casing driven by said shaft and communicating on its intake side with said sump, a fixed arbor mounted in said casing, a barrel rotatable on said arbor and carrying a plurality of groups of radial pump cylinders and plungers, said arbor being formed with intake and discharge ducts for all said groups, a flow line leading from the discharge side of said gear pump to the arbor intake duct of one of said groups, flow lines leading from the arbor discharge ducts of the other groups to said sump, and a driving connection from said drive shaft to said barrel.

5. In a pumping unit of the character described, the combination of a box-like casing the lower portion whereof forms an oil sump, a gear pump in said casing communicating on its intake side with said sump, a partition in said casing forming with a side wall of the latter an outflow passage for the oil discharged by said pump, and a by-pass valve on a side wall of said casing communicating with said out-flow passage, said valve functioning, when the flow of motive fluid from said gear pump is blocked to by-pass said motive fluid to said sump.

6. In a pumping unit of the character described, the combination of a casing the lower portion whereof forms an oil sump, a low pressure pump in said casing communicating on its intake side with said sump, a high pressure pump in said casing, a flow line connecting the discharge side of said low pressure pump with the intake side of said high pressure pump, and cut-off valve mechanism on said casing controlling said flow line and functioning to automatically interrupt the flow of low pressure oil therethrough when a predetermined pressure on the discharge side of said high pressure pump has been reached.

7. In a pumping unit of the character described, the combination of a casing the lower portion whereof forms an oil sump, a low pressure pump in said casing communicating on its intake side with said sump, a high pressure pump in said casing, a flow line connecting the discharge side of said low pressure pump with the intake side of said high pressure pump, an outwardly opening check valve in said flow line, and an automatic fluid-actuated cut-off valve mounted on a side wall of said casing across said flow line and beyond said check valve, said cut-off valve functioning to admit high pressure fluid against said check valve to hold the latter closed when a predetermined pressure on the discharge side of said high pressure pump has been reached.

8. In a pumping unit of the character described, the combination of a casing the lower portion whereof forms an oil sump, a low pressure pump in said casing communicating on its intake side with said sump and delivering oil at greater than atmospheric pressure, a high pressure pump in said casing, a flow line connecting the discharge side of said low pressure pump with the intake side of said high pressure pump, an outwardly opening check valve in said flow line, a valve-controlled air supply duct communicating with said flow line beyond said check valve, and means for locking said check valve closed whereby to permit said high pressure pump to pump air.

9. In a pumping unit of the type described, the combination of a casing, an arbor mounted in said casing, and a plurality of rotary pumps mounted side by side on said arbor, the latter being formed with intake and discharge ducts for the respective pumps.

10. In a pumping unit of the type described, the combination of a casing, an arbor mounted in said casing, a plurality of rotary pumps mounted side by side on said arbor, the latter being formed with intake and discharge ducts for the respective pumps, and means for independently varying the displacements of said pumps.

11. In a pumping unit of the type decribed, the combination of a casing, an arbor mounted in opposite side walls of said casing and extending across the latter, and a plurality of rotary pumps mounted side by side on said arbor, the latter being formed with independent longitudinal intake and discharge ducts for said pumps.

12. In a pumping unit of the type described, the combination of a casing, an arbor mounted in opposite side walls of said casing and extending across the latter, a plurality of rotary pumps mounted side by side on said arbor, the latter being formed with independent longitudinal intake and discharge ducts for said pumps, and means for independently varying the displacements of said pumps.

13. In a pumping unit of the type described, the combination of a box-like casing, a fixed arbor mounted in and between opposite side walls of said casing, and a high pressure pump and a plurality of other pumps rotatably mounted on said arbor in side by side relation, said arbor being formed with independent longitudinal intake and discharge ducts for said pumps opening through the ends of said arbor.

14. In a pumping unit of the type described, the combination of a box-like casing, a fixed arbor mounted in and between opposite side walls of said casing, a high pressure pump and a plurality of other pumps rotatably mounted on said arbor in side by side relation, said arbor being formed with independent longitudinal intake and discharge ducts for said pumps opening through the ends of said arbor, and means for independently varying the displacements of said pumps.

LOUIS E. GODFRIAUX.